(12) United States Patent
Breitweg et al.

(10) Patent No.: US 6,826,945 B1
(45) Date of Patent: Dec. 7, 2004

(54) METHOD FOR PRODUCING A RACK

(75) Inventors: Werner Breitweg, Bargau (DE); Bernd Koziara, Waldstetten (DE); Alfred Brenner, Heubach (DE)

(73) Assignee: ZF Friedrichshafen, Friedrichshafen (DE)

( * ) Notice: Subject to any disclaimer, the term of this patent is extended or adjusted under 35 U.S.C. 154(b) by 0 days.

(21) Appl. No.: 09/446,704

(22) PCT Filed: Jun. 18, 1998

(86) PCT No.: PCT/EP98/03724

§ 371 (c)(1),
(2), (4) Date: Dec. 23, 1999

(87) PCT Pub. No.: WO98/58754

PCT Pub. Date: Dec. 30, 1998

(30) Foreign Application Priority Data

Jun. 24, 1997 (DE) ........................................ 197 26 697

(51) Int. Cl.[7] .................................................. B21K 1/12
(52) U.S. Cl. .................... 72/406; 29/893.36; 74/422
(58) Field of Search ........................... 29/893.3, 893.32, 29/893.33, 893.34, 893.36; 72/370.04, 370.21, 406; 74/422

(56) References Cited

U.S. PATENT DOCUMENTS 4,133,221 A 1/1979 Clary
4,531,603 A * 7/1985 VanCise, Jr. ................. 180/428

FOREIGN PATENT DOCUMENTS

| DE | 1 175 089 | 7/1964 |
| DE | 33 24 035 A1 | 1/1984 |
| DE | 35 42 672 A1 | 6/1986 |
| DE | 40 06 038 A1 | 8/1991 |
| DE | 43 31 792 A1 | 3/1995 |
| GB | 1168191 | 10/1969 |

OTHER PUBLICATIONS

Dengelmaier, Roland Otto, Neuartige Verzahnung fur 1, ZF–Zahnstangen–Lenkungen, ATZ/MTZ–Sonderheft Fertigungstechnik 95/96, S. 16–18.
JP 2–124361 A., Patent Abstracts of Japan, M–1004, Jul. 31, 1990, vol. 14, No. 355.

* cited by examiner

Primary Examiner—Lowell A. Larson
(74) Attorney, Agent, or Firm—Stites & Harbison PLLC; Douglas E. Jackson

(57) ABSTRACT

A technique for manufacturing a gear rack (5) for a rack-and-pinion steering gear for automobiles makes use of a blank (18) for the gear rack (5) having at least in the latter's toothed area a form deviating from a circular cylinder. Size and form of the cross-section of the blank (18) are selected in a manner that the contour of the finished gear rack (5) in the toothed area (7) does not project beyond the envelope given by the dimensions of neighboring parts of the rack-and-pinion steering gear. The gear rack (5) is formed from the blank (18) by means of tumble-forging. After tumble-forging, the gear rack (5) in its toothed area (7) outside the toothed section has a convex or concave longitudinal profile, which serves to support the tumbling torques during tumble-forging.

8 Claims, 2 Drawing Sheets

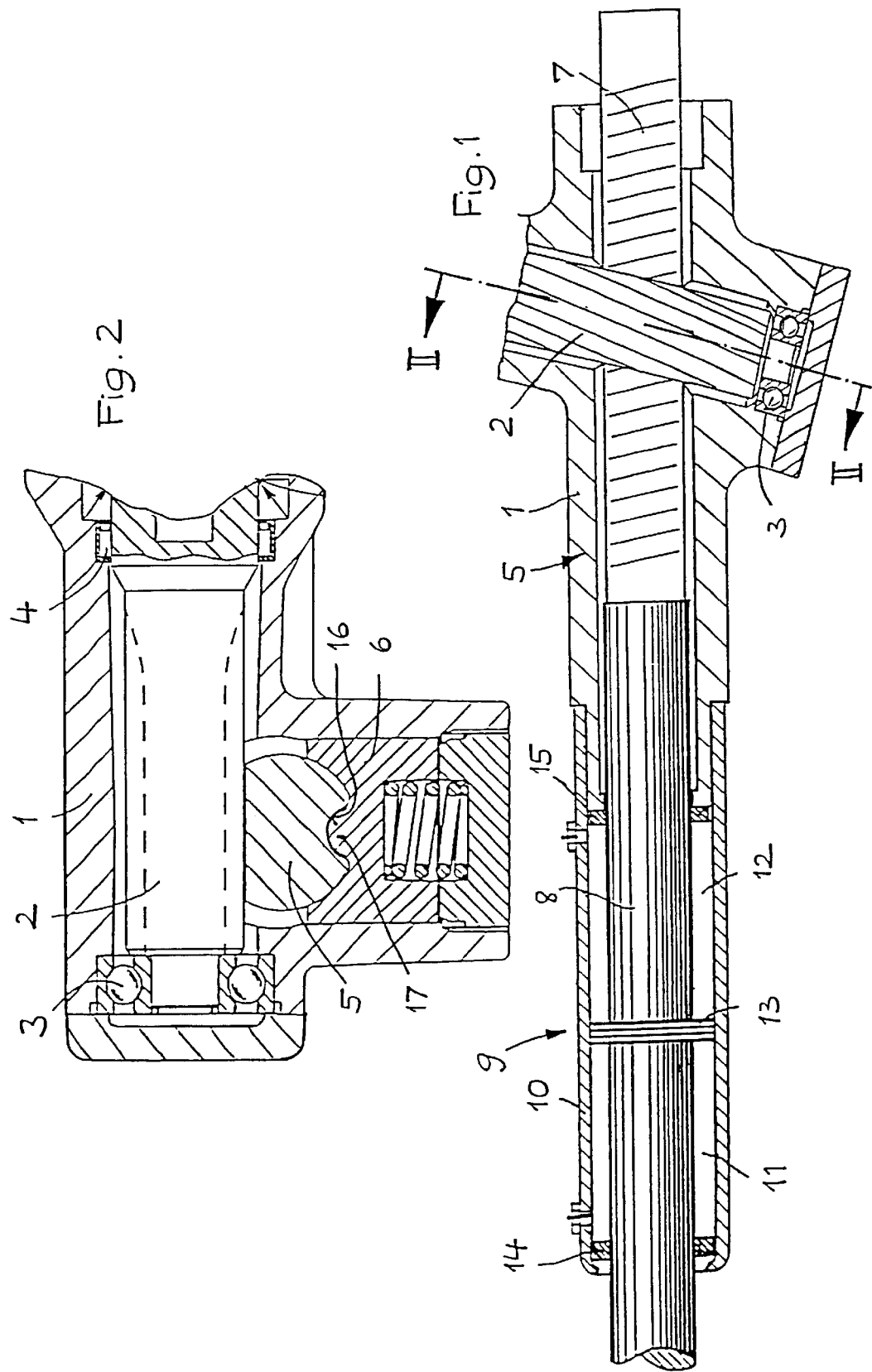

METHOD FOR PRODUCING A RACK

FIELD OF THE INVENTION

The invention relates to a technique for the manufacture of a gear rack for rack-and-pinion steering gears for automobiles, and to a gear rack manufactured by such a technique.

BACKGROUND OF THE INVENTION

Such a technique is known, for example, from DE 32 02 254 C2. With this technique, a cylindrical blank between an upper and a bottom tool is formed into a gear rack by means of tumble-forging. With this technique, as with all forging and pressing techniques, a burr is created, which in the known technique is specifically used as an extension of the cross-section of the gear rack. This increases gear rack resistance. However, it also increases installation space.

With regard to rack-and-pinion steering gears for automobiles, smaller installation space requirements and savings in weight are repeatedly requested.

BRIEF SUMMARY OF THE INVENTION

The object of the invention is to present a gear rack and a production method for such a gear rack which can meet the requests for smaller installation space and for savings in weight.

This object is solved by the technique presented hereafter, and by the gear rack described hereafter.

The technique for manufacturing such a gear rack begins with the selection of a gear rack blank, which at least in the toothed area has a form deviating from a circular cylinder. Size and shape of the cross-section of the blank are selected so that the contour of the finished rack in the toothed area does not project beyond the envelope given by the dimensions of neighboring parts of the rack-and-pinion steering gear. Then the gear rack is formed from the blank by means of a tumble-forging technique. After tumble-forging, the gear rack in its toothed area outside the toothed part has a convex or concave longitudinal profile, which during tumble-forging serves to support the tumbling torques.

Purposeful and expedient further developments of the technique are also described in hereafter. During tumble-forging, the longitudinal profile supports the tumbling torques, and in the finished rack it improves function by means of precise guidance and support on a pressure piece of the rack-and-pinion steering gear. The longitudinal profile can be provided on the blank during tumble-forging. This allows use of a blank with a relatively simple outer contour. But if it is possible to provide this longitudinal profile on the blank prior to tumble-forging, e.g., by stamping, pulling, or rolling, then tumble-forging can be limited to the forming of the blank in the toothed area of the gear rack. The specification that the contour of the finished gear rack in the toothed area should not project beyond a certain envelope can be met where the blank in the toothed area of the gear rack has at least flattening areas converging on each other, or two essentially symmetrically arranged X-section necks. For further weight savings, the blank—at least in the toothed area of the gear rack—can have at least one cavity extending in a longitudinal direction of the gear rack.

Since with the invented technique a lower degree of forming is achieved, a low-ductile material can be used. This allows additional reduction of gear rack costs.

A gear rack manufactured by this technique has a toothed area and at least one bearing and guiding area, just like other gear racks. But the gear rack manufactured by the invented technique has a contour, which in the toothed area does not project beyond an envelope given by the dimensions of neighboring parts of the rack-and-pinion steering gear. The envelope diameter of a rack-and-pinion power steering gear is given, for example, by the inner diameter of a sealing in the bearing and guiding area of the gear rack. The convex or concave longitudinal profile in the toothed area of the gear rack is ideally formed by a longitudinal groove located on the outer circumferential surface of the gear rack on the side opposite the teeth.

BRIEF DESCRIPTION OF THE DRAWINGS

In the following, the invention is explained by means of several examples presented in drawings.

The drawings show:

FIG. 1, a partial longitudinal section through a rack-and-pinion power steering gear;

FIG. 2, a cross-section along II—II in FIG. 1;

DETAILED DESCRIPTION OF THE INVENTION

Figure 3:
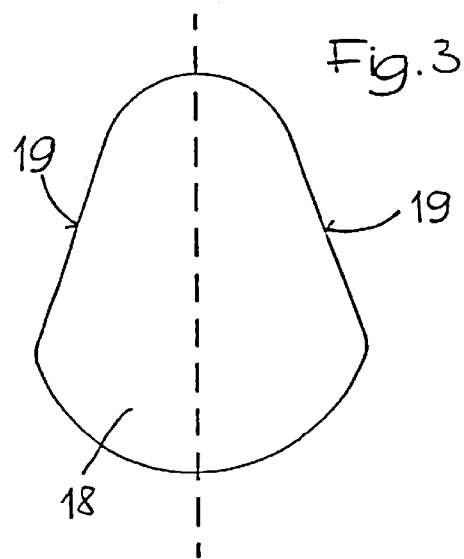
FIGS. 3 to 6, various cross-sections of a blank for a gear rack.

The invention is described for a rack-and-pinion steering gear with hydraulic power assistance, but it can also be used for rack-and-pinion steering gears with electric assistance or without power assistance.

In a steering gear housing 1, a pinion 2 is rotatably supported by two bearings 3 and 4. The pinion 2 with its teeth meshes with a gear rack 5, which is axially displaceably guided in the steering gear housing 1. In a familiar fashion, the gear rack 5 is pressed against the teeth of the pinion 2 by means of a spring-loaded pressure piece 6.

The gear rack 5 has a toothed area 7 and at least one bearing and guiding area 8. In the example shown in FIG. 1, where a rack-and-pinion power steering gear is shown, the bearing and guiding area 8 is at the same time the piston rod of a servomotor 9. The servomotor 9 contains in its cylinder 10 two cylindrical spaces 11 and 12, separated by a piston 13. The cylindrical spaces 11 and 12 are sealed off against the bearing and guiding area 8 of the gear rack 5 by means of seals 14 and 15.

The gear rack 5 in its toothed area on the outer circumferential surface, on the side opposite the toothed area, has a longitudinal groove 16. The longitudinal groove 16 cooperates with a longitudinal nose 17 on the pressure piece 6. This cooperation of longitudinal groove 16 and longitudinal nose 17 prevents tilting of the gear rack 5 during operation. The location of these two elements may be exchanged, the longitudinal nose located on the gear rack 5 and the longitudinal groove on the pressure piece 6, with the effect remaining the same.

In the following, the technique for the manufacture of such a gear rack is described. It is important that a blank 18 is selected, which at least in the future toothed area of the gear rack has a form which deviates from a circular cylinder. Some options for the cross-section of such a blank 18 are shown in FIGS. 3 to 6 on a magnified scale. When selecting a cross-section for the blank, it is essential to choose a size and form in such a manner that the contour of the finished gear rack in its toothed area does not project beyond an envelope given by the dimensions of then neighboring parts of the rack-and-pinion steering gear. In the case of a gear rack which is, for example, intended for a rack-and-pinion power steering gear according to FIG. 1, the diameter of the envelope is given by the inner diameter of sealing 15 which seals the cylindrical space 12 on the bearing and guiding area 8 of the gear rack 5.

In the version according to FIG. 3, the blank has two converging flattening areas 19 in the toothed area of the gear rack. Ideally, these flattening areas 19 are symmetrically arranged in relation to each other. The next step of the technique involves forming the blank 18 into the gear rack by means of tumble-forging. The support the blank 18 during tumble-forging against the tumbling torques, a concave longitudinal profile in the form of the later longitudinal groove 16 is provided on the blank 18 and thus on the gear rack 5 at the onset of tumble-forging.

Figure 4:
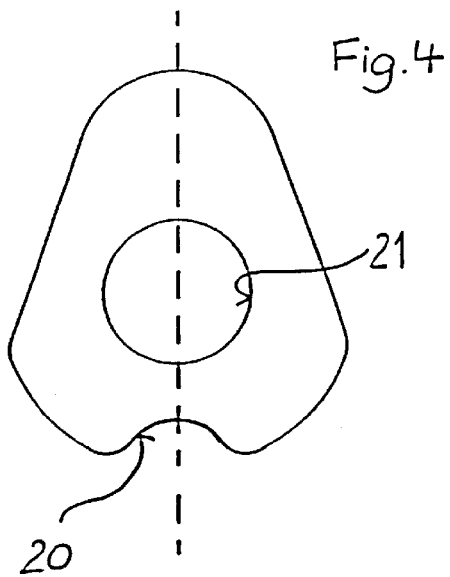

This step of the technique can be omitted if the blank 18 in its raw state already has a longitudinal groove 20 as shown in FIG. 4. Independent of the shape of the blank 18 as such, such a longitudinal groove 20 may be present also in other versions of blanks.

Figure 5:
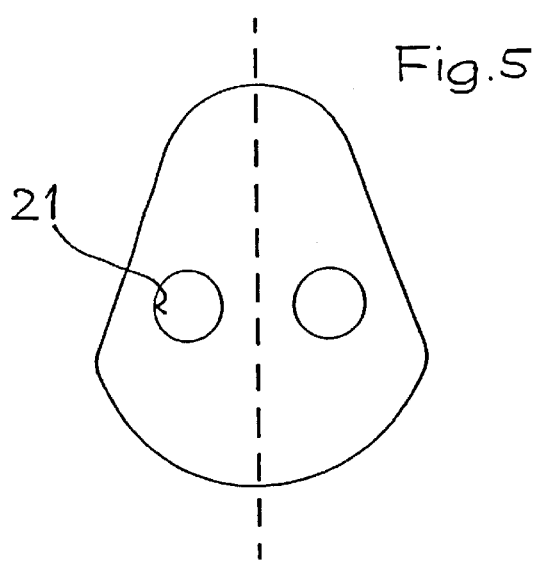
Figure 6:
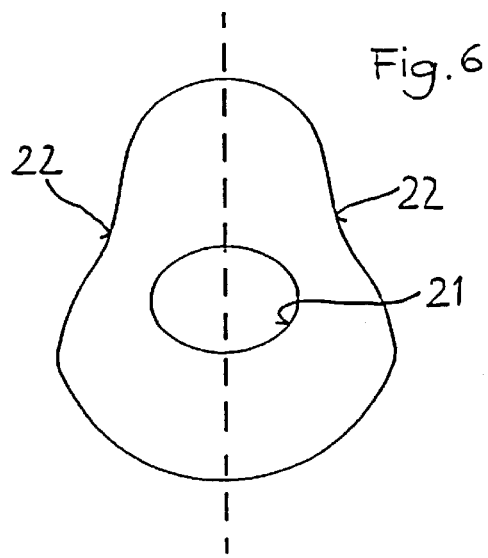

In the examples according to FIGS. 4 to 6, each blank 18 has at least one cavity 21 extending in longitudinal direction of the blank at least in the toothed area of the gear rack. In FIG. 5, the cavity 21 is divided into two sections; in FIG. 6 its shape is oval.

Instead of the two converging flattening areas 19, blank 18 in the version according to FIG. 6 has two essentially symmetrically arranged X-section necks 22 resulting in a somewhat pear-shaped cross-section.

Instead of one longitudinal groove 20, the blank can also have two or more smaller longitudinal grooves. It is possible to produce two or more such longitudinal grooves during tumble-forging. As mentioned above in the description of the gear rack, the longitudinal grooves 20 can also be provided on the blank as convex longitudinal grooves.

What is claimed is:

1. A method for the production of a gear rack for a rack-and-pinion steering gear for automobiles comprising the steps of:
    producing a blank for the gear rack having
        a) at least in its toothed area, a form deviating from a circular cylinder,
        b) in the toothed section of the gear rack, at least two flattening areas converging on each other and being essentially symmetrically arranged, and
        c) a cross-sectional surface which is smaller than a surface of an envelope encompassing a contour of the finished gear rack in the toothed section and determined by dimensions of adjacent parts of the rack-and-pinion steering gear; and
    tumble forging the gear rack from the blank so that after tumble-forging the gear rack in the toothed section thereof outside the toothed area has a concave longitudinal profile and such that during tumble-forging the longitudinal profile supports the tumbling-torques.

2. A method for the production of a gear rack as claimed in claim 1 wherein said tumble-forging step includes the step of producing the longitudinal profile on the gear rack.

3. A method for the production of a gear rack as claimed in claim 1 wherein said producing step includes the providing of the longitudinal profile on the gear rack so that the longitudinal profile is present on the blank prior to the tumble-forging step.

4. A method for the production of a gear rack as claimed in claim 1 wherein said producing step includes the providing of the blank, at least in the toothed section of the gear rack, with at least one cavity extending in a longitudinal direction of the gear rack.

5. A method for the production of a gear rack for a rack-and-pinion steering gear for automobiles comprising the steps of:
    producing a blank for the gear rack having
        a) at least in its toothed area, a form deviating from a circular cylinder,
        b) in the toothed section of the gear rack, at least two symmetrically arranged necks of a cross section,
        c) a cross-sectional surface which is smaller than a surface of an envelope encompassing a contour of the finished gear rack in the toothed section and determined by dimensions of adjacent parts of the rack-and-pinion steering gear; and
    tumble forging the gear rack from the blank so that after tumble-forging the gear rack in the toothed section thereof outside the toothed area has a concave longitudinal profile and such that during tumble-forging the longitudinal profile supports the tumbling-torques.

6. A method for the production of a gear rack as claimed in claim 5 wherein said tumble-forging step includes the step of producing the longitudinal profile on the gear rack.

7. A method for the production of a gear rack as claimed in claim 5 wherein said producing step includes the providing of the longitudinal profile on the gear rack so that the longitudinal profile is present on the blank prior to the tumble-forging step.

8. A method for the production of a gear rack as claimed in claim 5 wherein said producing step includes the providing of the blank, at least in the toothed section of the gear rack, with at least one cavity extending in a longitudinal direction of the gear rack.

* * * * *